United States Patent
Boukens et al.

(10) Patent No.: US 6,421,956 B1
(45) Date of Patent: Jul. 23, 2002

(54) METHOD AND APPARATUS FOR PRIMING SEED

(75) Inventors: Marcel Adrianus Nicolaas Boukens, Grootebroek; Jan de Boer; Ijsbrand van Dok, both of Enkhuizen, all of (NL)

(73) Assignee: Van Dok Ijsbrand, Enkhuizen (NL)

( * ) Notice: Subject to any disclaimer, the term of this patent is extended or adjusted under 35 U.S.C. 154(b) by 0 days.

(21) Appl. No.: 09/582,549

(22) PCT Filed: Dec. 28, 1988

(86) PCT No.: PCT/NL98/00740

§ 371 (c)(1),
(2), (4) Date: Nov. 6, 2000

(87) PCT Pub. No.: WO99/33331

PCT Pub. Date: Jul. 8, 1999

(30) Foreign Application Priority Data

Dec. 29, 1997 (NL) .............................................. 1007918

(51) Int. Cl.⁷ ................................................. A01G 31/00
(52) U.S. Cl. ........................................................ 47/61
(58) Field of Search ................................ 47/61, 59, 60

(56) References Cited

U.S. PATENT DOCUMENTS

| 2,725,673 A | * | 12/1955 | Perin ............................... 47/16 |
| 3,416,328 A | | 12/1968 | Davis et al. |
| 4,642,939 A | * | 2/1987 | Suzuki ............................ 47/14 |
| 4,912,874 A | * | 4/1990 | Taylor .......................... 47/58.1 |
| 4,989,367 A | * | 2/1991 | Chung ............................. 47/16 |
| 5,119,589 A | * | 6/1992 | Rowse ...................... 47/1.01 R |
| 5,873,197 A | * | 2/1999 | Rowse et al. ................. 47/58.1 |

FOREIGN PATENT DOCUMENTS

| EP | 0 171 553 | | 2/1986 |
| EP | 0 254 569 | | 1/1988 |
| FR | 1 536 921 | | 9/1968 |
| GB | 2163634 | * | 3/1986 |
| JP | 07289021 | | 7/1995 |
| WO | WO 96/08132 | | 3/1996 |

* cited by examiner

Primary Examiner—Charles T. Jordan
Assistant Examiner—Jordan Lofdahl
(74) Attorney, Agent, or Firm—Stroock & Stroock & Lavan LLP

(57) ABSTRACT

Method and apparatus for treating seed (5) with a fluid, in particular water, involving the use of a fluid-containing gas, whereby seed is brought into contact with a gas having a controlled fluid content and the seed is kept in contact with the gas over a defined period whilst direct contact between the seed and the fluid in liquid form is substantially precluded.

20 Claims, 1 Drawing Sheet

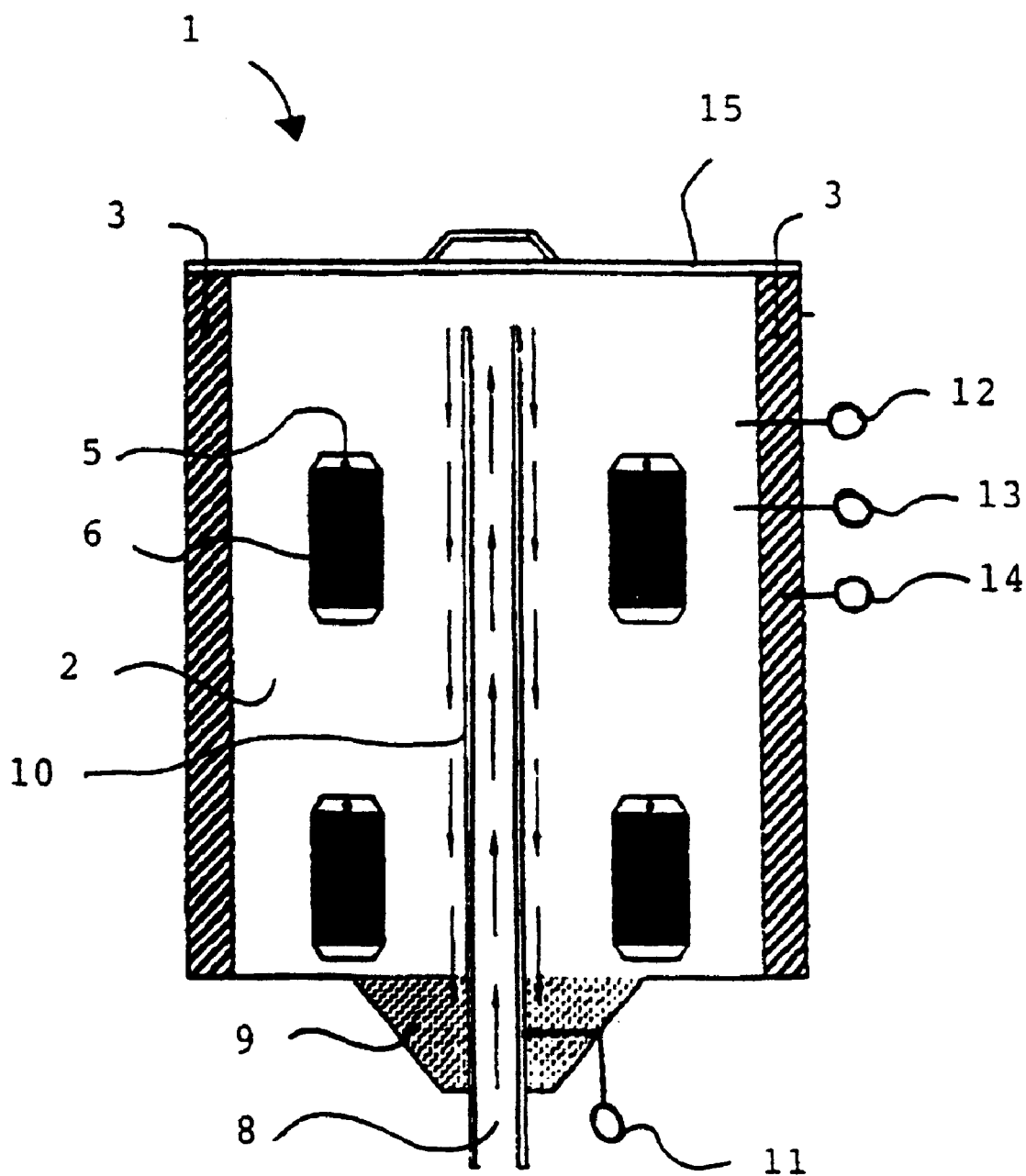

METHOD AND APPARATUS FOR PRIMING SEED

The present invention in the first place relates to a method for treating seed with a fluid, in particular water, involving the use of a fluid-containing gas.

In intensive agriculture it is important to supply high-quality seeds that germinate well, rapidly and uniformly. To improve the seed quality in these respects, seed which in the dry state shows hardly any metabolic activity and therefore is resting, is activated ("priming") by the seed being treated, for example, with water. As a result, the resting stage is interrupted and germination is stimulated. The treatment causes the seed to take up water (imbibition), as a result of which germination processes, not observable from the outside, commence in the germ.

The treatment with water does however entail a major risk that the seeds will actually germinate (i.e. that the root tip penetrates the pericarp). What should be aimed for, however, is to interrupt the water treatment just prior to the moment of germination, so that germination will not occur. After the treatment the seeds can be sown or can be dried (dehydrated). What has been found is that the pretreated, dehydrated seeds exhibit a high degree of germination synchronicity when they are sown and, moreover, keep well in this dry state.

The treatment with water does, however, have various problems which even today have not yet been resolved.

A method is known in the prior art which involves seeds being treated with steam in a rotating drum (U.S. Pat. No. 5,119,589). The steam condenses on the inside of the drum, with which the seeds keep coming into contact owing to the rotary movement of the drum. The seeds absorb this moisture and are removed from the wall by means of a scraper. This method has the drawback that the seeds are subjected to considerable physical stress, entailing a high risk that the seed will be damaged and will not germinate.

It is an object of the present invention to overcome the abovementioned drawbacks, the invention to this end being characterized in that seed is brought into contact with a gas having a controlled fluid content and the seed is kept in contact with the gas over a defined period whilst direct contact between the seed and the fluid in liquid form is substantially precluded.

The method of the present invention provides an excellent pretreatment of seed, without the latter coming into contact with fluid in liquid form and without the seeds having to be exposed to mechanical stress, as the fluid in question can be directly taken up by the seeds from the gas phase. It has also been found that with the aid of the method according to the present invention very precise pretreatment of the seeds can be ensured. Moreover, it has been found that a treatment according to the present invention leads to high-quality pretreated seed.

In this context reference is made to Allen et al., (Hort. Science, Volume 27 (4), pp. 364–366), who describe a method for pretreating seed with water by incubating the seed in an aqueous polyethylene glycol solution having a defined osmotic potential. This method, also referred to as "osmopriming", is generally known, but is expensive, given the large quantities of polyethylene glycol which are needed, and requires complicated treatment steps, during which large quantities of polluting polyethylene glycol have to be discharged in some way. Moreover, the uptake of oxygen by the seed is hindered by the viscous polyethylene glycol. Alternatively, the seeds can be subjected to osmotic treatment on a solid support, as described in U.S. Pat. No. 4,912,874. With this method, large quantities of polluting wastes are formed and there is a risk of the seed being damaged.

Preferably, the gas phase is substantially stationary and the fluid transport through the gas phase towards the seed takes place substantially via diffusion. With a stationary gas phase it has been found that the seed takes up the fluid very uniformly and slowly, diffusion processes playing a crucial part. The slower water uptake has advantages over the more rapid water uptake taking place in the case of osmopriming and water/steam treatment.

In particular, the fluid comprises water, in an amount of 99% or more. Whilst the method, in principle, is suitable for the pretreatment of the seeds with any liquid, the pretreatment generally takes place with water. This water can also contain supplementary substances such as minerals, hormones, pesticides and/or stimulants. Such substances can, however, also be added to the gas phase, if desired. For decontamination purposes use can be made, for example, of water containing chlorine bleach, for example in a concentration of 0.4 w/w%.

It should be clear that where the application refers to "fluid content of the gas phase" this can be read, in the case of water as the fluid used, as "relative humidity". If the gas phase is formed by air, the abovementioned term is comparable with "relative air humidity".

The optimum relative humidity for priming depends on the seed to be primed. It has been found that very good priming is achieved if the relative air humidity is 98% or more. In a preferred embodiment of the present invention, the relative humidity is 98% or more, more preferably 99% or more. Optimum priming is generally achieved if the humidity is maintained just below the saturation point in the gas, without saturation of the gas with the fluid occurring. Thus the moisture content is as high as possible, as a result of which priming of the seed can take place very rapidly and effectively. A fluid-saturated gas is undesirable, as there is then the risk that the fluid will condense on the seed, which can be deleterious as already described above.

Advantageously, the temperature of the gas is between 2 and 40° C., preferably between 8 and 30° C. In the latter temperature range good priming takes place, although higher or lower temperatures are possible. At higher temperatures, however, problems may occur, since not all types of seed may be resistant to such high temperatures.

Below 5° C., moisture will indeed penetrate the seeds, but the resting stage will not or virtually not be disturbed, and priming generally takes place to an insufficient degree.

Preferably, the temperature of the seed at the beginning of the treatment is between 8 and 35° C., as this temperature range corresponds to the temperatures to which the seeds or plants are generally exposed in nature.

Preferably, the temperature of the seed at the beginning of the treatment is equal to or higher than that of the gas. This prevents, at the beginning of the treatment, liquid or water from condensing on the outside of the seeds, the seeds thereby coming into contact with the liquid, with all the deleterious consequences already described above. Condensation on the seeds also results in a lower germination synchronicity being achieved.

Advantageously, the seed is treated over a period of 1–14 days. A longer treatment may lead to unwanted germination, whilst a shorter treatment may lead to inadequate synchronicity, as a result of a large number of seeds still being in the germination resting stage because they have not taken up enough water. The optimum duration of the treatment may differ between types of seed.

It has been found, surprisingly, that if the seed prior to the abovementioned fluid treatment is incubated in an environment which is saturated with said fluid, it is possible for optimal and well-synchronized accelerated priming to be achieved. The fact is that it has been found that the seeds which, in the dry state, have an osmotic pressure of from −400 to −100 MPa, first take up a considerable amount of water before the seeds become physiologically active and priming proper starts. This physiologically active phase sets in when the seed has taken up so much water that its osmotic pressure is greater than −10 MPa. "Greater than −8 MPa" refers to an osmotic pressure whose value is above −8 MPa. In principle this therefore means that a higher value amounts to a lower water uptake capacity. The said phase usually commences when the osmotic pressure of the seed is between −1.2 and −8 MPa. It is noted that the measurement of the osmotic pressure of seed can take place by general methods known in the prior art. Reference is made in this context to L. W. Woodstock, Journal of Seed Technology Vol. 12, no. 1 (1988).

During the physiologically active phase, the seeds are sensitive to being damaged. At the first water uptake (i.e. until the osmotic pressure has decreased to about −8 MPa), the seeds can in principle take up water in any manner chosen at will, for example in an environment saturated with the said fluid, for example by the seeds being sprayed, the seeds being immersed in water, or by the seeds being incubated on filter paper saturated with water. Only when the said osmotic pressure of greater than −8 MPa has been reached is it important for the seeds to be brought into contact with water in such a way that the water is taken up more slowly (the actual priming process).

Thus the method, according to another aspect of the invention, relates to treating seed with water, which at least comprises the steps of:

incubation of the seed in a water-saturated environment until the osmotic pressure of the seed is greater than −10 MPa, preferably between −1.2 MPa and −8 MPa, subsequent incubation of the seed under conditions of delayed water uptake.

This delayed water uptake can take place, in principle, in a manner known from the prior art, for example by the abovementioned osmopriming or steam treatment. Preferably, the seed, until the desired osmotic pressure of from −1.2 MPa to −8 MPa has been reached, is incubated in the fluid-saturated environment. For most seeds, a period of from 4 to 24 hours proved sufficient for the said osmotic pressure to be reached. It should be clear that the incubation time may vary depending on the type of seed. This incubation time and other conditions can be optimized empirically by those skilled in the art.

Preferably, the seeds are thus first incubated for 4–24 hours in a water-saturated environment and then in a chamber, substantially whilst precluding direct contact between seed and fluid in liquid form, at a relative air humidity of at least 98%. As already set out above, the seeds, once they have taken up sufficient water and the osmotic pressure of the seeds is from −1.2 MPa to −8 MPa, are sensitive to being damaged. As a result of the remaining water uptake being made to occur at a relative air humidity of at least 98%, without direct contact between seed and fluid in liquid form, substantially no damage will be caused to the seeds, while optimal synchronized priming takes place. During the priming process, the osmotic pressure of the seeds is brought to a value of between approximately −1.2 to −1.5 MPa and/or is maintained over a suitable period. It should be understood that if the seed, by direct water contact, has already acquired an osmotic pressure of between −1.2 and −1.5 MPa, no water has to be taken up by the seeds during the conditions of delayed water uptake, but that the osmotic pressure of the seeds is maintained at the said value.

The invention further provides seed obtainable by the method according to the invention and also a plant which is obtained from seed that has been pretreated by means of the method according to the present invention.

The invention further relates to an apparatus, designed particularly for implementing the method according to the invention, at least comprising a substantially closed chamber having supply and discharge means for a fluid, means being present for forming a transfer surface between the fluid and the gas in the chamber, and temperature control means being present for controlling a temperature difference between the fluid and the gas contained in the chamber. By means of this apparatus, an open fluid stream can be formed within a gas space. If the temperature of the air is chosen to be higher than that of the fluid stream, condensation of the fluid vapour from the gas phase onto the fluid stream can take place in a controlled manner, i.e. the relative air humidity of the gas phase can thereby be maintained below the saturation point in a controlled manner.

Conversely it is possible, by means of an apparatus of this type, for evaporation of the fluid from the open fluid stream into the gas phase to be effected in a controlled manner by the temperature of the air being kept below that of the fluid stream. This embodiment, however, has proved less relevant for use in the apparatus for priming seed.

It has been found that in the case of water as the fluid and air as the gas, a temperature difference of 0.1° C. involves a change in relative air humidity of 0.5%. Thus the relative air humidity can be maintained at 99.5% by choosing the temperature of the air to be 0.1° C. higher than that of the flowing fluid. If this temperature difference is 0.3° C., the relative air humidity will thus be about 98.5%. For a temperature difference of this type of 2° C., the relative air humidity is 90%.

An apparatus of this type thus allows very high air humidity below the saturation point to be maintained in the chamber in a controlled manner, without incurring the risk of the gas becoming saturated with the fluid. For example, it is possible to set a sustained stable high relative air humidity to an accuracy of 0.1–0.2%, for example 98%±0.2%, which are the optimum conditions for treating seed according to the present invention.

It is noted that the invention is also suitable for fluids other than water. Alternatively, for example, an oxygen-enriched air mixture can be used instead of air.

The temperature control means for controlling the temperature difference between the fluid and the gas in the chamber can advantageously comprise heating and/or cooling means in the wall of the chamber for heating or cooling, respectively, the gas contained in the chamber. Furthermore, it is also possible to control the temperature of the water feed.

The temperature of the wall of the chamber can thus be set to a value that differs from the temperature of the water, the gas contained in the chamber adopting the temperature of the wall of the chamber.

In order for a large and effective transfer surface to be obtained, the means for forming the transfer surface preferably comprise means for forming a flowing fluid layer in the chamber.

It has been found, surprisingly, that with the use of water as the fluid and air as the gas phase, a very high relative air humidity (above 98%) can be maintained in a controlled manner; the temperature difference between the temperature of the water and the temperature of the wall is small in this case (less than 0.6° C.), provided that the temperature of the wall and therefore of the gas contained in the chamber is higher than that of the water.

Advantageously, the means for controlling the temperature of the wall and/or the means for controlling the temperature of the fluid can be set such that a temperature difference between the fluid in the chamber and the wall of the chamber of 0.1° C. or less can be achieved. It is technically possible to control and maintain such a temperature difference between the water feed and the wall of the chamber, and this can be effected with the aid of means known from the prior art.

Given a temperature difference of this type of 0.1° C. it is possible for a relative air humidity in the chamber to be set accurately to 99.5%±0.2%. If required it is possible, likewise by adjusting the temperature difference, to set a correspondingly altered relative air humidity to the same accuracy, for example to 98.0%±0.2%.

In a following preferred embodiment the apparatus according to the invention comprises moistening means for bringing the seed directly into contact with the liquid. As already set out hereinabove, it is advantageous for the seeds first to be caused to take up water by direct water contact such as spraying, until the osmotic pressure of the seeds is from about −1.2 MPa to −8 MPa. By means of the moistening means, which can, for example, take the form of sprayers and can be incorporated in the wall of the apparatus, it is possible for the seeds to be sprayed directly with water which can then be taken up by the seeds. The seeds can be sprayed over a desired period, after which the air humidity can be set to 98% or more in the above-described manner, in order to complete the priming process.

The invention further provides a method for operating the apparatus according to the invention, which involves the seed to be treated with fluid being brought into the closed chamber, water being caused to flow through the chamber in such a way that the water can be taken up in the gas phase, and the temperature of the wall being set to a temperature which is above that of the water, the temperature difference between the water and the wall being at most 0.6° C., preferably at most 0.4° C. By virtue of this temperature difference, a high relative air humidity of more than 98% can be obtained within the chamber, at which humidity level priming of the seed contained in the chamber, can take place. Preferably, the temperature difference is at most 0.2° C. With such a low temperature difference, a relative air humidity of 99%±0.2% can be achieved.

After the correct amount of water has been taken up, the seeds can either be sown directly or alternatively be dried again, in order for the seeds to be sown at a later time.

The invention further relates to a method for treating seed as described hereinabove, which involves increasing the temperature of the wall after treatment of the seed is complete, in order to set a fluid content below 98% in the gas phase of the chamber, these measures being taken in such a way that the fluid is abstracted from the seeds. Drying of the seeds takes place as soon as the relative air humidity drops below 98%. Obviously, if required, the air humidity can be set to any value below 98% by the said temperatures being controlled. As already set out hereinabove, a relative air humidity of 90% can be maintained by setting the temperature difference to 2° C. As a result of the seeds being kept in the apparatus for a defined period at a relative air humidity below 98%, drying ("dehydration") can take place.

The invention will be described in more detail with reference to the accompanying drawing, in which the single figure shows a cross-section of an embodiment of the apparatus according to the present invention in simplified form.

An apparatus 1 comprises a chamber 2 with a gas, which is delimited by a wall 3 and a cover 15. Incorporated in the wall 3 are spiral cooling and heating elements, respectively (not shown). The chamber holds a quantity of seed 5 in nets 6, which are suspended in the chamber 2. The number 10 indicates a hollow tube placed in the centre in the apparatus 1. Through the interior of tube 10, water is supplied via a feed line 8 and is distributed over the outer surface of the tube 10. As a result, a large transfer surface is obtained between the water and the gas space 2. The water is collected and removed via a discharge 9. Positioned at the location of the fluid inlet is a temperature sensor 11 for measuring the temperature of the fluid feed. A hygrometer 12 measures the air humidity of gas space 2. The temperature of the chamber 2 is measured by a temperature sensor 13. A temperature sensor 14 measures the temperature of the wall. Not shown are means connecting one or more measuring instruments to a control unit, which can be linked to control means (likewise not shown) for the cooling and heating elements 4 of wall 3 and for temperature adjustment means for the water to be fed in. The control unit can also comprise a data input.

During operation, water, whose flow direction is indicated in the figure by means of arrows, is introduced into the apparatus 1 via the line 8 and is distributed over the outer surface of the tube 10. The temperature of the wall is higher than that of the water feed, so that during the transport of the water across the tube 10 the uptake of water vapour from the gas phase into the water is effected. This results in a lowering of the relative humidity with respect to the saturation point in the chamber 2. The water coming from the outer surface of the hollow tube 10 is collected by discharge 9 and is removed.

Depending on the desired relative air humidity in chamber 2, the temperature difference between the water feed and the temperature of wall 3 can be set with the aid of the above-described control unit and control means, which are linked to the measuring instruments 11, 12, 13 and 14. The seeds contained in the chamber can be introduced into the gas space 2 and be removed by cover 15 being opened. As a result of the seeds not coming into direct contact with the fluid, no condensation will take place on the seeds, as long as the temperature of the seeds, when they are introduced into the apparatus, is not below that of the air in chamber 2.

The invention will now be explained in more detail with reference to a few examples.

EXAMPLE 1

To establish the effect of direct water contact on the seeds during the imbibition phase (i.e. the water uptake by the seeds until an osmotic pressure of −8 MPa or more is obtained), various batches of crop seeds were incubated on supersaturated filter paper, on unsaturated filter paper and on a combination of supersaturated and unsaturated filter paper (imbibition period A, B and C, respectively).

Germination temperature: 25° C.

Number of seeds per item: 4×25

Germination medium: filter paper Schleicher & Schull no. 597

Tomato

Imbibition methods:

A: 2×filter paper+4 cc of water (per Petri dish)

i.e. supersaturated!
B: 5×filter paper+4 cc of water
C: 24 hours 2×filter paper+4 cc of water, then
24 hours 5×filter paper+4 cc of water, then
continuously 2×filter paper+4 cc of water.

| Germination after . . . days: | 5 | 6 | 7 | 8 | 9 | 10 | 14 |
|---|---|---|---|---|---|---|---|
| Imbibition method A | 0 | 16 | 24 | 28 | 40 | 48 | 72 |
| Imbibition method B | 4 | 12 | 28 | 48 | 64 | 68 | 88 |
| Imbibition method C | 4 | 32 | 40 | 56 | 68 | 72 | 92 |

Melon
  Imbibition methods:
    A: 2×filter paper+6 cc of water (per Petri dish)
    B: 6×filter paper+6 cc of water
    C: 24 hours 2×filter paper+6 cc of water, then
      24 hours 6×filter paper+6 cc of water, then
        continuously 2×filter paper+6 cc of water.
Melon −1

| Germination after . . . days: | 2 | 3 | 4 | 5 |
|---|---|---|---|---|
| Imbibition method A | 12 | 20 | 20 | 24 |
| Imbibition method B | 4 | 52 | 64 | 68 |
| Imbibition method C | 40 | 58 | 69–8 | 68 |

Paprika
  Imbibition methods:
    A: 2×filter paper+6 cc of water (per Petri dish)
    B: 6×filter paper+6 cc of water
    C: 12 hours 2×filter paper+6 cc of water, then
      24 hours 6×filter paper+6 cc of water, then
        continuously 2×filter paper+6 cc of water.
Paprika −1

| Germination after . . . hours: | 72 | 84 | 96 | 120 |
|---|---|---|---|---|
| Imbibition method A | 16 | 52 | 76 | 96 |
| Imbibition method B | 64 | 84 | 92 | 96 |
| Imbibition method C | 60 | 80 | 80 | 92 |

Paprika −2

| Germination after . . . hours: | 72 | 84 | 96 | 120 |
|---|---|---|---|---|
| Imbibition method A | 32 | 32 | 72 | 92 |
| Imbibition method B | 60 | 72 | 76 | 88 |
| Imbibition method C | 60 | 76 | 88 | 92 |

The above shows that imbibition method A leads to reduced germination. Incubation on unsaturated filter paper results in good germination taking place. By combining the two methods A and B, germination is considerably accelerated, however.

EXAMPLE 2

In a subsequent experiment, tomato seeds were incubated on two layers of S&S 594 filter paper, at 25° C. and 4 cc of water. The seeds were then primed for seven days at 25° C. and 99% relative air humidity. For comparison, seeds were subjected to standard osmopriming in 3% strength KNO3. After priming the seeds were dried at 30% relative air humidity. The seeds were then sown onto sowing compost at 15° C.

Germination at 15° C. on Sowing Compost

| Germination after . . . days: | 4 | 7 | 10 | 14 |
|---|---|---|---|---|
| Tomato -1 untreated | 0 | 6 | 42 | 90 |
| osmopriming | 14 | 75 | 85 | 94 |
| window priming | 45 | 79 | 88 | 92 |

The above summary shows that priming according to the method of the present invention, i.e. at a relative air humidity of at least 98% whilst precluding direct contact between seed and liquid, preceded by direct contact between the seed and the liquid, produces more rapid germination than osmopriming. With untreated seeds germination takes longest.

What is claimed is:

1. A method for treating at least one seed with water, comprising: bringing the seed into contact, over a defined period in a closed chamber with a gas having a controlled water content, while direct contact between said at least one seed and said water in liquid form is precluded and said water is caused to flow through said chamber in such a way that water in the gas phase can be taken up by the seeds within said chamber, said chamber comprising one or more heat exchange surfaces as temperature control means for controlling the temperature difference between the water and the gas in said chamber, wherein the temperature of one or more heat exchange surfaces is set to a temperature which is higher than that of said water flowing through said chamber.

2. The method of claim 1, wherein the temperature difference between the water and the wall of the chamber is at most 0.6° C.

3. The method of claim 1, wherein the gas phase is substantially stationary and the water transport through the gas phase towards said at least one seed takes place substantially via diffusion.

4. The method of claim 1, wherein the relative humidity of the gas phase within the chamber is at least 98%.

5. The method of claim 1, wherein completion of the treatment of said at least one seed is followed by the temperature of the heat exchange surfaces being further increased, in order to set a water content in the gas phase of the chamber of less than 97%, these steps being taken in such a way that water is abstracted from the seeds.

6. The method of claim 1, wherein said at least one seed, prior to the treatment, is incubated in an environment which is saturated with water vapor.

7. The method of claim 6, wherein at least one seed is incubated for such a period in said water vapor saturated environment of the osmotic pressure of said at least one seed after said treatment is in the range of −1.2 to −8 MPa.

8. The method of claim 6, wherein said at least one seed is incubated for 4 to 24 hours in said water vapor saturated environment.

9. A seed treated according to the method of claim 1.

10. A plant obtained from said seed of claim 7.

11. A method for treating at least one seed with water, which comprises:

(a) incubating said at least one seed in a water-saturated environment until the osmotic pressure of said at least one seed is greater than −10 MPa and −1.2 MPa; and (b) subsequently incubating said at least one seed under conditions of delayed water uptake, wherein the condition of delayed water uptake comprises incubation of said at least one seed in a chamber having a relative humidity of at least 98%, substantially precluding direct contact between said at least one seed and said water in liquid form.

12. A seed treated according to the method of claim 1.

13. A plant obtained from the seed of claim 12.

14. An apparatus for priming a seed with a fluid comprising a closed chamber having supply and discharge means for a fluid and a gas, means for forming a fluid transfer surface between the fluid and the gas in the chamber, and means for forming a heat exchange surface for absorbing or providing heat, respectively, to or from the chamber, respectively, wherein said apparatus further comprises a temperature control means for controlling the temperature difference between said fluid and said gas contained in the chamber, and wherein said apparatus precludes direct contact between said seed and said fluid in liquid form.

15. The apparatus of claim 14, wherein the temperature control means further comprises heating and/or cooling means in the wall of said closed chamber for heating or cooling respectively, said gas present in said chamber.

16. The apparatus of claim 15, wherein the means for controlling the temperature of the wall and/or the means for controlling the temperature of said fluid can be set such that a temperature difference between said fluid within said closed chamber and the wall of said chamber of 0.6° C. or less can be achieved.

17. The apparatus of claim 14, wherein the apparatus comprises a moistening means for bringing the seed directly into contact with said fluid in a liquid form.

18. The apparatus of claim 17, wherein said fluid provided by said moistening means is selected from the group consisting of:

(a) water;

(b) an aqueous solution comprising a plurality of plant nutrients;

(c) an aqueous solution comprising at least one compound capable of preventing microbial growth;

(d) an aqueous solution comprising at least one compound capable of preventing fungal growth;

(e) an aqueous solution comprising an insecticidal agent;

(f) an aqueous solution comprising at least one compound capable of preventing viral growth; and (g) an aqueous solution comprising a plurality of plant nutrients in addition to at least one agent capable of preventing microbial growth and at least one agent capable of preventing fungal growth.

19. The method of claim 2, wherein the temperature difference between said water and said wall is at most 0.2° C.

20. The method of claim 11, wherein said osmotic pressure of said at least one seed is between −8 MPa and −1.2 MPa.

* * * * *

UNITED STATES PATENT AND TRADEMARK OFFICE
CERTIFICATE OF CORRECTION

PATENT NO.   : 6,421,956 B1
DATED        : July 23, 2002
INVENTOR(S)  : Marcel Adrianus Nicolaas Boukens, Jan de Boer and Ijsbrand van Dok It is certified that error appears in the above-identified patent and that said Letters Patent is hereby corrected as shown below:

<u>Title page,</u>
Item [22], should read -- PCT Filed: December 28, 1998 -- as opposed to "PCT Filed: December 28, 1988".

Signed and Sealed this

Tenth Day of December, 2002

JAMES E. ROGAN
*Director of the United States Patent and Trademark Office*